DATA CONVERSION SYSTEMS

Filed Aug. 6, 1962 2 Sheets-Sheet 1

INVENTOR.
Alvin Ross Simpson
BY Mueller & Aichele
Attys.

DATA CONVERSION SYSTEMS

Filed Aug. 6, 1962 2 Sheets-Sheet 2

INVENTOR.
Alvin Ross Simpson
BY Mueller & Aichele
Att'ys

United States Patent Office 3,229,047

Patented Jan. 11, 1966

3,229,047

DATA CONVERSION SYSTEMS

Alvin Ross Simpson, Oak Park, Ill., assignor to Motorola, Inc., Chicago, Ill., a corporation of Illinois Filed Aug. 6, 1962, Ser. No. 215,059
6 Claims. (Cl. 179—100.3)

The present invention relates to a data conversion system and particularly to a data readout system wherein coded information signals of a first type initiate removal of information of a different type from a storage device so that the removed information may be independently scanned to provide signals of a second type.

There are many present day applications wherein a coded signal from a computer or like source is compared with signals scanned from a storage device to select information stored therein, and to subsequently cause removal of the stored information. To this end a serial code is temporarily re-arranged in parallel form in a static memory device or buffer stage. A like code is recorded as an indexing field on the storage device, while spatially related to the recorded field is the desired information. Parity between the code in the buffer stage and a like code in the indexing field causes readout of desired stored information. Typically in prior art arrangements the indexing and the information fields are recorded in axial spatial relationship around the periphery of a magnetic storage drum. Since the desired information is usually recorded and stored for readout in parallel form, and since in many practical applications it is necessary to serialize this information, often on a different time base than the time base of the look-up of the information, complex gating and switching circuitry must be employed in conjunction with the readout device.

In a particularly useful application of the data translating readout system of the present invention, the desired stored information consists of a dictionary of selected words recorded as sound tracks on the storage device. The signal from the computer is digital in form, as is the indexing code recorded in spatial relationship to the stored information. A rapid scanning operation between the code from the computer and the indexing code selects words stored in the information field in sequence for transfer to a readout device. Upon transfer to the readout device, each individual word is seriallw scanned at a rate to produce an audio signal for vocalization of the word.

Since acceptable audio reproduction of a given word after transfer to the readout device may require a time interval in the order of seconds, it is necessary that such a system have a relatively slow scanning rate. On the other hand, it is necessary that the scanning time of the information prior to transfer to the readout device be appreciably faster than the scanning time of the readout device so that the lookup time between successive words is insusceptible to the listener. As previously mentioned prior art data translating systems, particularly those utilizing magnetic drum storage, require complex gating and switching circuitry to serialize information removed from storage on a different time base than the time base required for lookup and removal of the information from storage.

Accordingly, it is an object of the present invention to provide an improved system for scanning data removed from a storage device to provide a serialized information signal, which system is simplier and has greater flexibility than those heretofore known.

It is another object of the invention to provide means to receive and convert information transferred from a storage device to an electrical signal for direct utilization of the information so transferred.

A further object of the invention is to provide an improved system for transferring data stored in an information field to a readout device and for producing readout of the data so tansferred on a time base independent of the time base required for selection and transfer of the stored information.

A still further object of the invention is to provide a system to sequentially scan at a predetermined rate information transferred from a storage medium to produce an electrical signal in response thereto.

A still further object of the present invention is to provide a readout system capable of producing a vocalized reproduction of information that is canned and transferred from an information field recorded on a storage medium in a time interval interceptable in comparison with the vocalization interval.

A feature of the present invention is the provision of a readout device to temporarily store and to scan an optical image of a photographic record transferred from a storage medium to produce an electrical signal indicative of the information contained in the optical record.

A further feature of the present invention is the provision of a photoconductive pickup tube to receive an optical image of a photographic record transferred from a storage medium. The image is temporarily stored by the tube as a charge pattern, and the charge pattern is scanned with an electron beam at a given rate to produce an electrical signal having an independent time base so that signals indicative of the stored information may be provided independently of the time required for look-up and transfer of such information from the storage field.

Another feature of the invention is the provision of an optical system having means to project a light beam through an optically recorded information track and means to condense the light beam and dissect the image thereby produced so that segments of the image may be impressed in a vertical column on a photosensitive target of a pickup tube.

A still further feature of the present invention is the provision of apparatus to project in a predeterimned pattern an optical image of a photographic record transferred from an information storage device onto the photosensitive surface of an image storage tube so that the image so stored may be scanned at a predetermined rate to produce an information signal in response thereto.

FIG. 4 is a perspective view of the present invention in mechanical form.

In the data conversion system employing the readout apparatus of the present invention, information signals constituting a dictionary containing a vocabulary of a predetermined number of words are stored in the form of a variable density or variable area photographic recordings on a transparent memory drum. In addition, a code which may be digital or binary in form is recorded in spatial relationship with the information signals. Accordingly, there are two spatially related photographic records on the memory drum, which records will be referred to hereinafter as the vocabulary field and the digital field. The drum is caused to rotate so that the digital field is scanned by suitable pickup devices. Parity between a digital signal received from a remote computer and signals produced by scanning the digital field on the transparent memory drum initiates a strobe light source. The light beam produced by this light source is directed through an optical system located adjacent to selected portions of the vocabulary field to project an image of selected words in the vocabulary field onto the face of a readout device. This image may then be scanned to produce an audio output signal. The readout device includes a photoconductive pickup tube of the slow scan type conventionally employed in slow scan television pickup systems. This tube functions both as an image storage device and as an image reading device so that the variable density or variable area image projected from the storage drum onto the photosensitive face plate of the tube can be scanned by an electron beam to produce an electrical output signal which is proportional to the optical density or area of the image projected onto the face of the pickup tube. When scanned by the electron beam at an appropriate rate the output signal is at an audio frequency and is used to cause vocalization of individual words transferred from the vocabulary field.

Figure 1:
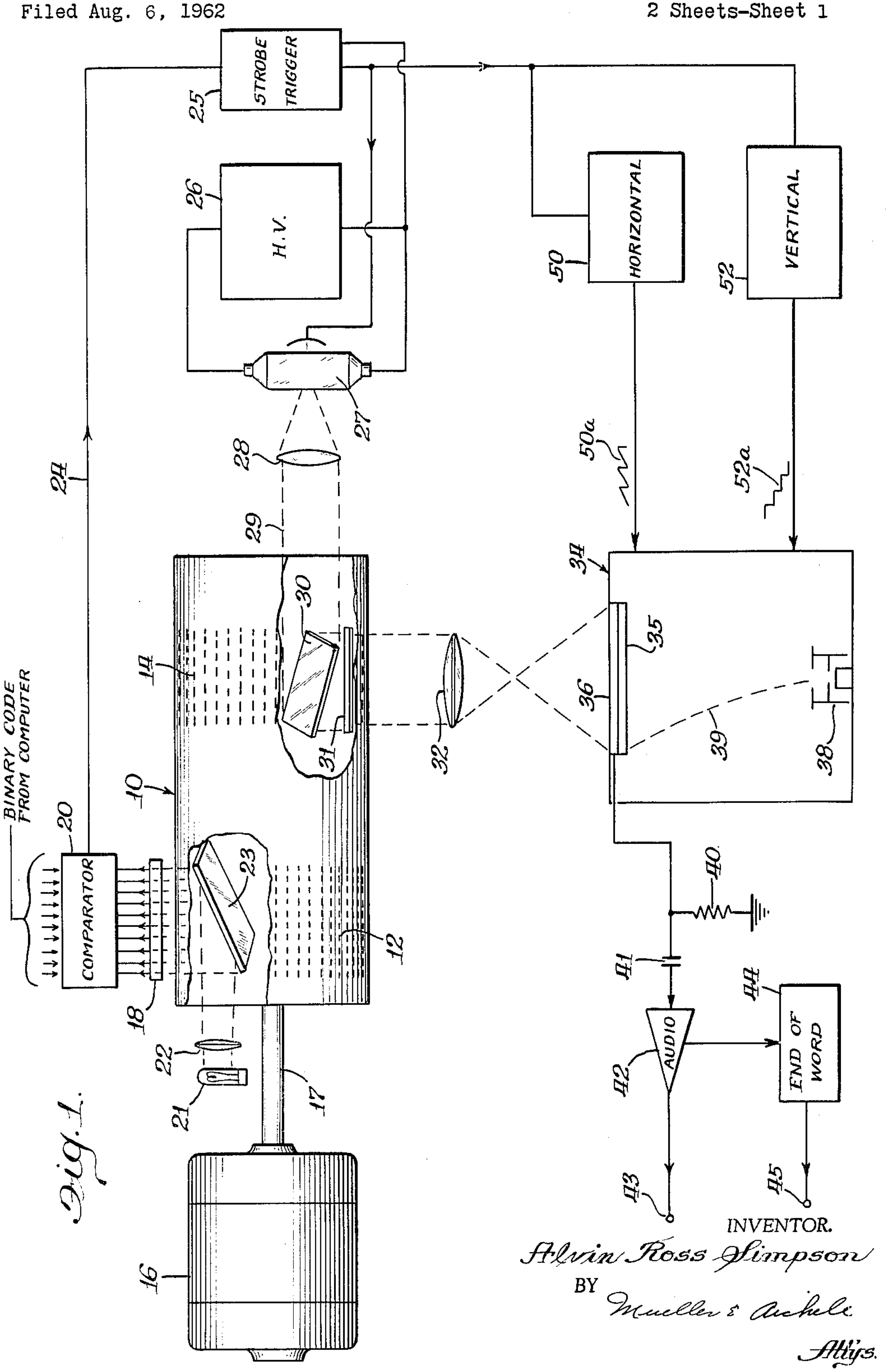
FIG. 1 is a diagram partially in perspective and partially in block form of a data conversion system embodying the readout system of the present invention.

With reference to FIG. 1 there is shown a data conversion system utilizing a photoconductive pickup tube as a readout apparatus. This data conversion system may be of the type as fully set forth in the copending United States application Serial No. 214,946, filed August 6, 1962, by Evan Ragland and commonly assigned.

Transparent drum 10 includes a vocabulary field 14 having a plurality of variable density or variable area optical sound tracks recorded around its periphery. Each individual sound track represents a single word and the total number of such sound tracks disposed around the periphery of drum 10 constitutes the vocabulary of the system. A digital field 12 comprising a plurality of binary codes is also recorded around the periphery of the drum. Each individual digital code is spatially related to and indexed with each word in vocabulary field 14 so that selection of a binary code results in selection of a given word to be subsequently removed from the vocabulary field.

Motor 16, coupled to the drum by shaft 17, causes rotation of the drum at a predetermined constant speed. Typically drum 10 may be rotated at 3600 r.p.m. Pickup head 18 scans the digital field as the drum rotates. A fixed light source including incandescent lamp 21, lens 22 and mirror 23 project an optical image of the digital field onto pickup head 18. This pickup head may conveniently include a plurality of photosensitive pickup devices such as PN semiconductor junctions. For purposes of illustration the digital code may consist of a ten bit binary code and accordingly there is one photosensitive pickup device for each bit in the code.

A like binary code is supplied to comparator 20 from a buffer stage such as a shift register in a remote computer. The comparator is of a type conventional in the computer art wherein parity between coded signals fed to the two inputs produces an output signal. Accordingly, parity between the signal supplied to the comparator from pickup head 18 and the signal supplied to the comparator from the computer produces an output pulse on lead 24 to initiate strobe trigger circuit 25. Strobe trigger circuit 25 in turn causes discharge of a high voltage energy pulse, in the order of several thousand volts, from high voltage energy supply 26 through lamp 27 to produce a short duration high intensity light pulse. Typically a hydrogen strobe lamp when pulsed from a 2,000 volt energy source will generate light pulses of a duration of 2–4 microseconds.

A lens system, shown in simplified form in FIG. 1 to illustrate system operation, projects the light pulse from strobe lamp 27 into transparent drum 10 and then through selected portions of the vocabulary field 14 recorded thereon. Lens 28 collimates the light pulse produced by strobe lamp 27 into a parallel beam of light 29. This light beam is deflected at right angles by mirror 30. An additional cylindrical condensing lens 31 vertically compresses the light beam as it is directed through vocabulary field 14. Objective lens 32 projects the image of a word selected from vocabulary field 14 onto the readout device. In this manner a selected one of optical words in vocabulary field 14 is projected onto photoconductive target 35 of photoconductive pickup tube 34 for subsequent scanning to produce an audio readout signal.

Photoconductive pickup tube 34 and its associated focusing and deflecting circuitry is similar to those employed in slow scan television pickup systems. A detailed description of pickup tubes of this type is set forth in "Television" by V. K. Zworykin and G. A. Morton, second edition, Wiley and Sons, New York, 1954. The pickup tube is illustrated here in simplified schematic form to show its cooperation in the overall data conversion system. Briefly, transparent signal plate 36 has one side coated with a photoconductive material having a high dark resistance to form photoconductive target 35. Signal plate 36 is maintained at a slightly positive potential with respect to the cathode potential of the electron gun 38 of the pickup tube. An optical image of selected portions of vocabulary field 14, projected on photoconductive surface 35, results in local flow of photocurrent to change the charge density or area so that the image is reproduced as a charge pattern. Photoconductive surface 35 is selected to have a relatively long persistance for storage of this charge pattern for at least one second, the maximum time required for readout of the selected word. When scanned by electron beam 39 electron flow from the beam varies in proportion to the charge pattern caused by the projected image to replace the charge on photoconductive target 35 to its original uniform value. A signal in proportion to this electron flow is developed across resistor 40 and is coupled by capacitor 41 to audio amplifier 42. In this manner photoconductive pickup tube 34 temporarily stores the optical image projected from audio field 14 by the light pulse from strobe lamp 26 in the form of a charge density pattern. As the stored image is scanned by electron beam 39, an audio frequency electrical signal is developed to drive associated audio equipment, resulting in a vocalized reproduction of selected audio words transferred from the vocabulary field.

Audio amplifier 42 is conventional in form and produces a signal at terminal 43 to drive a loudspeaker. Amplifier 42 also provides a signal to end-of-word detector 44. Detector 44 rectifies the audio signal and converts it to a control voltage appearing at terminal 45, which voltage may be coupled back to the computer program logic to indicate to the computer that vocalization of a selected word has been completed. The computer then shifts the next code representative of a word in a sequential message to the comparator 20 for comparison with codes scanned from digital field 12 by pickup head 18. The sequence of transfer and readout of a selected word from vocabulary field is then repeated for the next word without a preset and unnatural delay in the vocalization of words in a sequential message.

The focusing deflection coil circuits and the accelerating voltage supply, all conventional in the television industry, may be physically associated with photoconductive pickup tube 34 to form a compact unit. Typically electron gun 38 is maintained at a positive potential in the range of 200–300 volts while the gun cathode is maintained at a potential at or near ground. Signal plate 36 is maintained 10–30 volts positive with respect to the electron gun potential.

The horizontal deflection voltage for electron beam 39 is provided by horizontal sweep generator 50 and the vertical deflection voltage is provided by vertical sweep generator 52. These two deflection voltage generators are reset, triggered and synchronized by a signal from strobe trigger supply 25 so that concurrently with the projection of an optical image of a word selected from vocabulary field 14 onto photoconductive surface 35 scanning by electron beam 39 is initiated. In the instance where the words in vocabulary field 14 are variable density optical recordings, resulting in a corresponding variable density change pattern on target area 35, a straight line scan may be employed. Where variable area recordings are utilized beam 39 may be subjected to vertical modulations of sufficient amplitude to cover the image area and at a frequency above the audio range. Further, it should be apparent that the image projected from the audio field may be transformed into other convenient patterns such as circular or spiral patterns by appropriate lens systems or fiber-optic image converters, with corresponding scanning by known deflection techniques.

Although it is possible to provide pickup tube 34 with a generally rectangular, elongated target area and of sufficient resolving capacity to provide readout of a complete word by a single line scan, conventionally shaped pickup tubes may be used by dissecting the selected image transferred from the audio field so that segments of the image are vertically stored on a photoconductive target 35. It is then possible by synchronizing a horizontal sawtooth sweep voltage with a vertical stair-step voltage to scan successive vertical segments to provide a complete scan of the dissected image. Thus, for each step of vertical deflection voltage a signal horizontal scan is produced by the sawtooth sweep voltage. Waveforms 50*a* and 52*a* illustrate scanning in this manner.

The resolving capacity of conventional photoconductive pickup tubes for television applications are limited by the physical dimensions of the tube, and typically this resolving capacity is 1200 TV lines per linear scan, or 600 complete optical cycles. Thus, for a single line scan of one second, a time period compatible with good audio reproduction, the frequency response is limited to 600 cycles per second. To increase the frequency response limit of the output signal, the image is enlarged and divided into a number of sections, with each section successively positioned below the preceding section. The dissected image of a single audio word transferred from the audio field then covers the entire rectangular surface of the photoconductive target. This enables a plurality of segments making up a single optical word to be scanned in a one second interval to increase the frequency response limit of the system to acceptable audio values.

Figures 1, 2, 3:
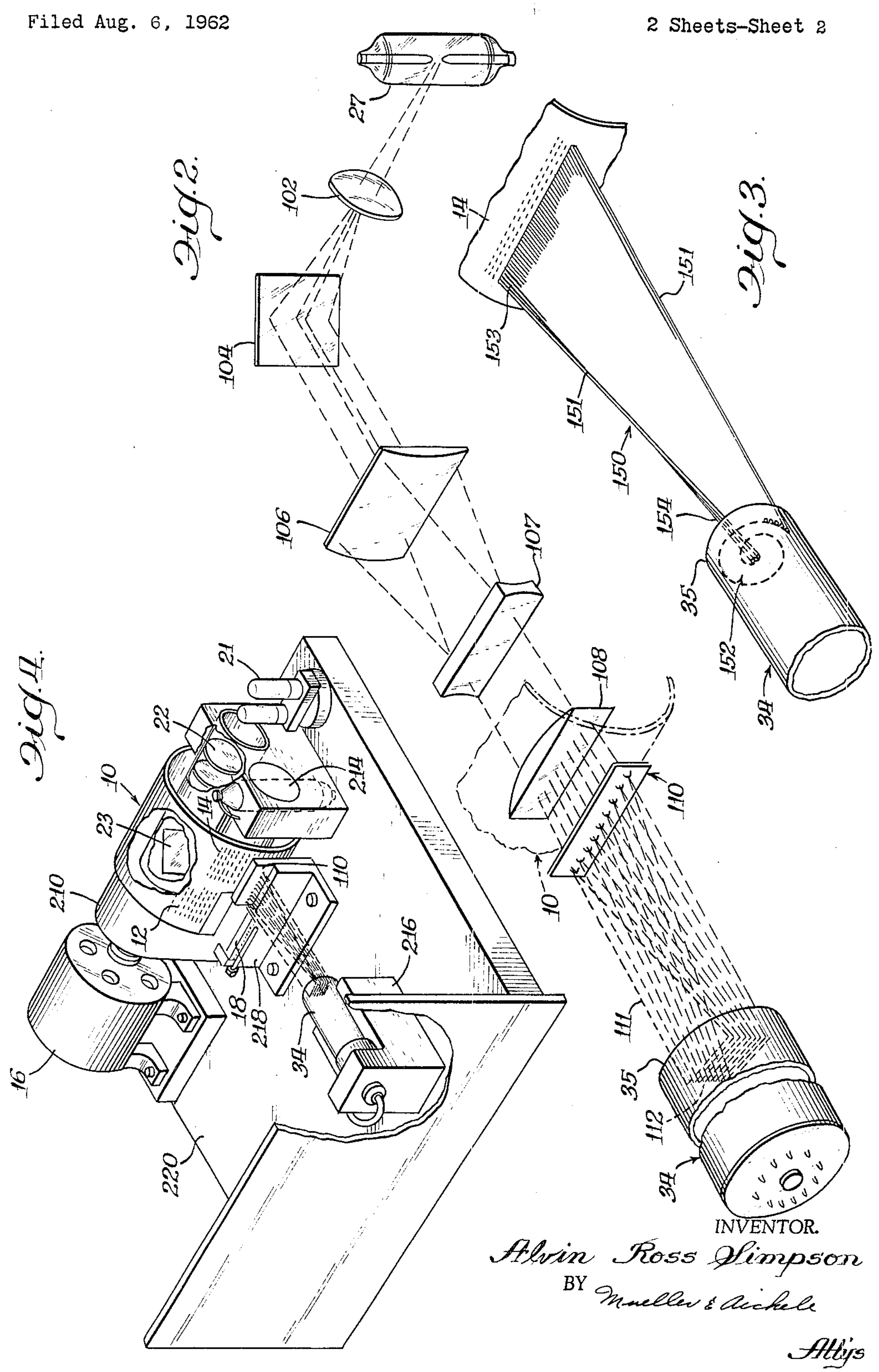
FIG. 2 is a perspective drawing of an optical system for projecting images onto the readout device of the present invention.
FIG. 3 is a perspective view of a modification of the optical system of the invention.

An optical system for dissecting a single word image to cause it to be incident upon the total sensitive area of the photoconductive target is shown in FIG. 2. The light pulse from strobe lamp 27 is collimated into a parallel beam by spherical lens 102. The light beam is deflected by mirror 104 to cylindrical condensing lens 106. Condensing lens 106 vertically compresses the light beam so that it may be concentrated on a selected area of the audio field recorded on the transparent drum. The condensed beam is then returned to a parallel condition by negative cylindrical lens 107 just prior to passing through the vocabulary field on the transparent drum. An additional cylindrical lens 108 located on the opposite side of the vocabulary field on the transparent drum and at right angles to negative cylindrical lens 107 disperses the light beam in a horizontal direction so that it may be directed to a plurality of projections lenses 110. Each of projection lenses 110 is simple achromat having a short focal length. These lenses are arranged to project segments 111 of the optical image transferred from the vocabulary field of the transparent drum onto the photoconductive target of pickup tube 34 so that each segment is vertically disposed above the other to form of charge density patterns 112. This allows utilization of the entire target area of the pickup tube and at the same time allows rapid scanning of each individual segment to provide increased output frequency response.

The dissected image, stored on photoconductive surface 35 as a plurality of vertically disposed segments 112, is scanned by the electron beam to provide vocalization of the entire word in a time interval compatible with audio reproduction, typically one second. Since there is now a plurality of scan lines during the vocalization interval of the selected word, the frequency response capabilities of the output signal is increased proportionately to the number of segments into which the word is dissected. It is possible, for example by dissecting the audio word into nine segments and derating the resolving capabilities of the photo conductive pickup device by fifty percent to achieve a readout frequency response of 300 to 3,000 cycles per second. This frequency response is easily capable of reproducing intelligible speech reproduction.

Scanning of the segmented work image is achieved by sawtooth generator 50 and stair-step generator 52, as shown in FIG. 1. When triggered by a signal from strobe trigger 25 a sawtooth voltage wave 50*a* is applied to the horizontal deflection circuit of the photoconductive pickup tube so that one cycle of the sawtooth causes the electron beam to scan one segment of the dissected word image. Synchronized with the sawtooth voltage is stair-step voltage 52*a*, applied to the vertical deflection circuit of the photoconductive pickup tube so that at the end of horizontal scanning of each segment of the word image the electron beam is moved vertically to allow the next segmented word image to be horizontally scanned. At the end of scan of all the segments of the dissected word image, scan generator 50 and the stair-step generator 52 are reset and triggered for scanning of a subsequent word image by a signal from strobe trigger 25.

A further modification of the optical system for projecting word images onto the photoconductive surface of pickup tube 34, wherein thin fibers of transparent material such as glass, plastic, and the like are utilized to convey an optical image, is shown in FIG. 3. Fiber-optic bundle 150 transmits the image projected from vocabulary field 14 onto photoconductive target 35 while at the same time converting the image into a desired configuration, such as a spiral shown at 152. Individual fibers 151 (with selected ones emphasized for clarity of illustrations) which make up fiber-optic bundle 150 channel or guide light entering ends 153 at a proper angle along their length. With ends 153 of a plurality of fibers longitudinally disposed next to the selected word recorded in vocabulary field 14, the entire word image is so guided by fiber-optic bundle 150.

Individual fibers 151 are small in diameter (in the order of .002 inch in diameter) and may be flexed or bent to propogate segments of an image entering flat, polished ends 153 at an angle small enough to cause total reflection within the fiber over a predetermined path. The sum of all such image segments intercepted by bundle 150 transmits an entire image in a coherent manner to be projected from ends 154. Ends 153 and 154 are laced or potted together in a desired pattern and situated immediately adjacent vocabulary field 14 and photoconductive torget 35, respectively, by suitable mounting means, while intermediate portions of fibers 151 may remain loose or be enclosed in a protective sheath. If desired, fibers 151 may be clad with a material having a different index of refraction than the fiber itself to reduce interference between adjacent fibers. It is apparent that the shape or pattern which the transmitted image takes may be determined by the disposition of fiber ends 154, and although shown as providing a spiral image on target 35, fiber-optic bundle 150 can take other forms to provide an image having any desired pattern which may be conveniently scanned by the electron beam of pickup tube 34.

A mechanical embodiment of the data conversion system of the present invention, adapted to function as a digital-to-voice converter, is shown in FIG. 4. Hollow glass drum 10, with digital field 12 and audio field 14 recorded photographically thereon, is rotatably supported by hub assembly 210. Assembly 210 includes precision ball bearings and a shaft coupled to motor 16. Cylindrical drum 10 is dynamically balanced and adapted to be rotated at 3600 r.p.m.

Cylinder 10 contains lens system 22 and mirror 23 so that the light beam produced by incandescent lamps 21 may be projected through digital field 12 onto pickup head 18. A stand-by lamp is provided so that on failure of one the other may be automatically rotated into position. Shielded container 214 contains strobe lamp 27 and a lens system shown of the type shown in FIG. 2. A slit aperture in container 214, located opposite the vocabulary field of the rotating drum, allows a narrow pulse of light to be projected through the transparent drum to image dissecting lens assembly 110. The dissected image is projected into the photoconductive target of photoconductive pickup tube 34, supported on mounting bracket 216. Mounting bracket 218 supports pickup head 18 and dissecting lens assembly 110 next to the digital field and the vocabulary fields recorded on drum 10 so that the spatial relationship between these two fields will properly select a word for readout upon parity of signals supplied to comparator 20. Alternately the fiber-optic image converting system of FIG. 3 may be used in place of lens assembly 110. The entire mechanical assembly is compactly mounted on chassis 220, which chassis also provides suitable mounting for the associated electronic circuitry of FIG. 1. This circuitry is preferably transistorized and mounted on individual circuit board assemblies for ease of replacement and maintenance.

Thus, there has been described a novel data conversion system utilizing simple and flexible readout arrangement. Although discussed for illustrative purposes in terms of digital-to-voice conversion, it should be apparent that the system of this invention may be utilized for any general type of data conversion wherein direct readout of information transferred from a storage device is desirable. Both the indexing and the information fields, photographically recorded on the transparent storage drum, may be either digital or analog in form. Because of independent scan of these two fields and because of the direct readout features of the described data conversion system, extremely flexible operation may be achieved. Depending on the nature of the information to be read out, the charge pattern of the optical image temporarily stored on the target of the photoconductive pickup tube may be adapted for single line scan, multi-line scan, or scanning in more complex paths such as a spiral or circle. The optical system used to transfer the recorded image to the pickup tube may be adapted to dissect the image or connect it to a predetermined pattern, and the tube itself may have a target area of various shapes for use with a particular application. The rate of scan of the transferred information is completely independent of the rate of look-up of the information stored in the transparent drum, and provides for direct readout of the information in the same form as it is stored so that complex switching and gating circuitry is not necessary for utilization of the selected information.

I claim:

1. A voice readout system including in combination, a transparent storage medium having a plurality of optical sound tracks recorded thereon, access means to select a given sound track, means coupled to said access means to produce a light pulse upon selection of said sound track, a photoconductive pickup tube, an optical system to project an image of said sound track onto the photoconductive target of said pickup tube upon production of said light pulse, said optical system acting to dissect said image into a plurality of sections, with said sections of said dissected image being vertically disposed one above the other to substantially cover the entire photoconductive target of said pickup tube, means to cause the electron beam of said storage tube to scan said photoconductive target at a rate proportional to the recording rate of said optical sound track to provide an audio frequency signal responsive to said stored image, and means responsive to said signal to produce an audible output, whereby a vocalization of said sound track is provided upon selection and transfer from said storage medium.

2. In a voice readout system having an optical density sound track recorded on a storage medium and a pulse light source to illuminate selected portions of said storage medium to thereby transfer an image of selected sound tracks to the photoconductive storage area of a readout device, an optical system including in combination, first lens to form a parallel beam of light from the light pulse produced by said light source, second lens to vertically compress said light beam for passage through a selected sound track on said storage medium, third lens to horizontally disperse the light beam conveying the image produced by passage of said light beam through said sound track, and a plurality of projection lenses intercepting the dispersed image conveying light beam to dissect said image into a plurality of sections and project said sections of the dissected image vertically one above the other on the photoconductive storage area of said readout device.

3. An information readout system including in combination, a transparent storage medium having a plurality of information tracks recorded thereon, each of said tracks being comprised of a plurality of successive sections, access means to select a given information track, means coupled to said access means to produce a light pulse upon said selection to develop an optical image of said given information tracks, readout means for scanning said successive sections of said optical image of said given information track, an optical system for receiving said optical image, separating said successive sections and projecting the same onto said readout means, with said successive sections being disposed in a predetermined pattern on said readout means.

4. An optical system for use with a data translating system having an optical density information track recorded on a storage medium and a pulsed light source to illuminate selected portions of said storage medium to thereby transfer an image of selected information tracks to the photoconductive storage area of a readout device, said optical system including in combination, means to form a parallel beam of light from the light produced by the light source and to vertically compress said light beam before said light beam illuminates the selected portions of said storage medium, said compressed light beam acting to form an image of said selected information tracks, and means for dissecting said image into a plurality of sections and projecting said image so that said sections are vertically disposed one above the other on the photoconductive storage area of said readout device.

5. In a voice readout system having an optical density sound track recorded on a storage medium and a pulse light source to illuminate selected portions of said storage medium to thereby transfer an image of selected sound tracks to the photoconductive storage area of a readout device, including in combination, a dispersing lens, means for projecting the light beam produced by said light source through a selected sound track on said storage medium, and said dispersing lens acting to disperse the light beam conveying the image produced by the passage of said light beam through said sound track in a direction perpendicular to the direction of projection of said light beam, and a plurality of projection lenses intercepting the dispersed image conveying light beam to dissect said image into a plurality of sections and to project said sections vertically one above the other on the photoconductive storage area of said readout device.

6. In a voice readout system having a plurality of optical sound tracks recorded on a storage medium and a pulsed light source to illuminate a given portion of said storage medium to thereby transfer an image of a selected sound track to the photoconductive storage area of a readout device, an optical system including in combination, a fiber-optic bundle having a plurality of light conducting fibers therein, optical means to project the light beam through the selected portion of said storage medium to produce an image of the selected sound track on said fiber optic bundle, said plurality of fibers being arranged to convert said image to a spiral pattern and to transmit the same to the photoconductive storage area of said readout device.

References Cited by the Examiner

UNITED STATES PATENTS

| | | | |
|---|---|---|---|
| 2,533,242 | 12/1950 | Gridley. | |
| 2,721,990 | 10/1955 | McNaney | 340—149 XR |
| 2,771,595 | 11/1956 | Hendrickson et al. | |
| 2,897,399 | 7/1959 | Garwin | 340—173 XR |
| 2,894,255 | 7/1959 | Murphy | 340—347.4 |
| 3,059,064 | 10/1962 | Lebell | 179—100.3 |

OTHER REFERENCES

Pages 5–10, November, 1961—Kaseman, P. W. and Parker, J. F., New Tubes For Use With Fiber-Optics Devices and Krolak, L. J., Fiber Optics For High-Resolution Displays and Pickup Systems. In R.C.A. Engineer.

IRVING L. SRAGOW, *Primary Examiner.*